United States Patent [19]
Kaufman et al.

[11] Patent Number: 6,080,343
[45] Date of Patent: *Jun. 27, 2000

[54] METHODS FOR FREEFORM FABRICATION OF STRUCTURES

[75] Inventors: Stephen G. Kaufman; Barry L. Spletzer, both of Albuquerque, N. Mex.

[73] Assignee: Sandia Corporation, Albuquerque, N. Mex.

[*] Notice: This patent issued on a continued prosecution application filed under 37 CFR 1.53(d), and is subject to the twenty year patent term provisions of 35 U.S.C. 154(a)(2).

[21] Appl. No.: 08/819,644

[22] Filed: Mar. 17, 1997

[51] Int. Cl.[7] .................................................... B29C 43/30
[52] U.S. Cl. .................... 264/40.5; 264/40.7; 264/255; 264/296; 264/313; 264/314; 264/319
[58] Field of Search .................................. 264/313, 40.5, 264/40.6, 40.7, 255, 294, 308, 33, 34, 319, 296; 156/222, 280, 63

[56] References Cited

U.S. PATENT DOCUMENTS

| | | | |
|---|---|---|---|
| 1,283,630 | 11/1918 | Bean et al. | |
| 2,151,307 | 3/1939 | Smith | 154/4 |
| 2,198,685 | 4/1940 | Wallace | 108/6 |
| 2,418,551 | 4/1947 | Greneker | 264/258 |
| 2,652,595 | 9/1953 | Kish | 18/47.5 |
| 2,943,969 | 7/1960 | Boyer et al. | 156/222 |
| 2,987,098 | 6/1961 | Daniel | 154/1 |
| 3,076,231 | 2/1963 | Vertin | 264/248 |
| 3,222,436 | 12/1965 | Woodworth | 264/34 |
| 3,661,683 | 5/1972 | Engel et al. | 156/580 |
| 3,837,965 | 9/1974 | Mahon et al. | 156/382 |
| 3,898,117 | 8/1975 | Taylor | 156/222 |
| 3,985,598 | 10/1976 | Trenda et al. | 156/54 |
| 4,078,032 | 3/1978 | Wenner | 264/248 |
| 4,145,389 | 3/1979 | Smith | 264/40.7 |
| 4,163,638 | 8/1979 | Smith | 264/40.7 |
| 4,205,408 | 6/1980 | Glass et al. | 264/258 |
| 4,352,707 | 10/1982 | Wengler et al. | 156/359 |
| 4,397,701 | 8/1983 | Johnson et al. | 264/258 |
| 4,554,036 | 11/1985 | Newsom | 156/94 |
| 4,555,836 | 12/1985 | Martin | 29/428 |
| 4,652,319 | 3/1987 | Hammond | 156/94 |
| 4,749,347 | 6/1988 | Valavaara | 425/135 |
| 4,863,663 | 9/1989 | Nico, Jr. et al. | 264/258 |
| 4,890,235 | 12/1989 | Reger et al. | 264/313 |
| 4,972,351 | 11/1990 | Reger et al. | 264/313 |
| 4,997,615 | 3/1991 | Cattanach | 168/572 |
| 5,151,277 | 9/1992 | Bernardon et al. | 264/313 |
| 5,183,598 | 2/1993 | Helle et al. | 264/255 |
| 5,200,133 | 4/1993 | Dieul et al. | 264/257 |
| 5,286,438 | 2/1994 | Dublinski et al. | 264/220 |
| 5,296,335 | 3/1994 | Thomas et al. | 264/308 |
| 5,344,602 | 9/1994 | Yencho | 264/258 |
| 5,358,683 | 10/1994 | Rhodes | 264/515 |
| 5,374,388 | 12/1994 | Frailey | 264/258 |
| 5,398,193 | 3/1995 | DeAngelis | 364/468 |
| 5,401,154 | 3/1995 | Sargent | 425/114 |
| 5,470,590 | 11/1995 | Brubaker et al. | 425/2 |
| 5,759,325 | 6/1998 | Davis | 156/154 |
| 5,779,833 | 7/1998 | Cawley et al. | 156/89.11 |
| 5,900,207 | 5/1999 | Danforth et al. | 264/603 |

OTHER PUBLICATIONS

H. B. Olsen and J. J. Craig, Automated Composite Tape Lay–Up Using Robotic Devices, Proceedings, 1993 IEEE International Conference on Robotics and Automation, IEEE Computer Society Press, Los Alamitos, CA, vol. 3, pp. 291–297 (1993).

*Primary Examiner*—Jan H. Silbaugh
*Assistant Examiner*—Stefan Staicovici
*Attorney, Agent, or Firm*—V. Gerald Grafe; Andrew Abeyta

[57] ABSTRACT

Rapid prototyping methods and apparatuses that produce structures made of continuous-fiber polymer-matrix composites without the use of molds. Instead of using molds, the composite structure is fabricated patch by patch in layers or wraps, using a two- or three-axis stage connected to a rapidly-reconfigurable forming surface, and a robot arm to position the evolving composite structure, which are both programmable devices. Because programmable devices are included, i.e., a robot and a two- or three-axis stage connected to the reconfigurable forming surface, the control program needed to produce a desired shape can be easily modified to automatically generate the desired shape from an electronic model (e.g., using a CAD/CAM system) of the desired (predetermined) shape.

14 Claims, 7 Drawing Sheets

Step 100: Configuring a forming apparatus to form the predetermined shape in a predetermined manner.

Step 110: Clamping the forming apparatus to hold in place

Step 200: Manipulating the forming apparatus (e.g., robot) with manipulating means in a predetermined manner Step 300: Providing material to the forming apparatus.

Step 400: Curing a patch of the plurality of patches.

Step 410: Curing material 40 by applying pressure to the patch with pressure means, by, for example, inflating a pressure or spring bladder.

Step 420: Applying heat to the patch with heating means where appropriate.

Step 430: Maintaining the temperature of heater 130 for a predetermined time (dwell time), if a heater is used, when it reaches a temperature appropriate for shaping material 40.

Step 440: Releasing pressure by venting pressure bladder when heater 130 reaches the consolidation temperature of material 40 via control commands 240 in accordance with control program 260.

Step 450: unwind the wrist (as necessary) of the robot arm 10 as it is limited in its rotation after one full revolution and should return to its initial position before the next patch is started.

Step 500: Advancing to a next patch until the structure is formed.

FIG. 5

METHODS FOR FREEFORM FABRICATION OF STRUCTURES

GOVERNMENT RIGHTS

This invention was made with United States Government support under Contract No. DE-AC04-94AL85000 awarded by the U. S. Department of Energy. The Government has certain rights in this invention.

CROSS-REFERENCE TO RELATED APPLICATIONS

Not applicable.

BACKGROUND OF THE INVENTION

The present invention relates generally to the field of parts manufacturing. More specifically, the present invention relates to methods and apparatuses for forming structures using robotic devices without the use of molds.

Although the present invention can be used in any application requiring that a part or structure be fabricated from a certain material without molds, it will be presented herein as it applies to composite materials for convenience in introducing the invention. The present invention, as will be evident from the following discussion, can be used for fabricating parts from any material without the use of molds. The materials used can be any material that (1) can adhere to itself, and (2) can be cured (e.g., by applying heat, pressure, curing agents, plasmas (e.g., charged particles, charged ions, electron beams, etc.)), ultraviolet treatments, some other means of curing, etc.) to maintain its shape.

A composite material, as its name implies, includes two or more distinct materials. The composite exhibits the best properties of the constituent materials. Well-known examples of composite materials include bricks made of mud and straw, and structures made of concrete and reinforcing bars. Composites of ceramic and metal have recently become available.

The composite materials of interest in the field of the present invention include a high-modulus fiber and a polymer binder. The non-fibrous material is called the matrix; examples of the matrix are thermosets, such as epoxy resins, and thermoplastics, such as nylon. The types of matrix are subdivided into thermosets and thermoplastics. Thermosetting materials are chemically and irreversibly altered during the cure process, which often involves the application of heat. In some cases, the heat is the exotherm of the curing reaction. Thermoplastics simply melt when heated; they can be remelted a number of times, though they degrade after a number of heating/cooling cycles.

These materials are available in a number of forms. The fiber can be separate from the matrix material, or it can be already impregnated with it. The latter form is called prepreg. Thermoplastics, which are solid at room temperature, can be commingled, or woven, with the fibers, or preconsolidated, where they are already melted together with the fiber. Preconsolidated and prepreg materials are often sold as rolls of flat tape, which can be dispensed through a dispensing means.

Available methods of forming structures of continuous-fiber polymer-matrix composites (hereinafter "CFPM composites"), which are fiber reinforced, all require mandrels, molds, forms, or dies. Such forms place constraints on the producible shapes. For example, filament winding on a mandrel cannot produce concave objects, and the requirement that the mandrel be removed from the interior of the finished structure makes very difficult the fabrication of shapes having a wider cross-section in the middle than at the ends. The need for mandrels, molds, forms, or dies adds expense to the cost of fabricating a new shape, particularly if only a few copies of the shape are desired.

In contrast to this state of affairs, other materials can be fabricated into complex shapes by various methods of rapid prototyping. These technologies are characterized by the ability to produce shapes of very high complexity directly from an electronic model of the shape, without requiring fabrication of a new form. An example is stereolithography, in which the shape is built up layer by layer, using a computer-controlled laser to selectively cure epoxy resin. To produce a new shape, only the software controlling the curing is changed; no changes to the hardware are necessary. Stereolithography, however, can build only structures composed of pure resin, or resin containing chopped, non-continuous fiber. Another example of rapid prototyping is laser sintering, in which the laser energy bonds powdered metal and/or ceramic. Given the success of these technologies, it is desirable to have a method of rapid prototyping for CFPM composites, so that the domain of rapid prototyping is extended to these high-modulus, low-weight materials.

Such a method would be able to produce shapes of high complexity, not subject to the shape constraints imposed by the need for molds; furthermore, the only change to the system needed to produce a new shape would be to the control software, which would be automatically generated from an electronic model of the shape. Such a method would have the dual advantages of being able to produce shapes currently producible only with great difficulty, and at lower cost because mandrels need not be made.

Fabrication methods for composite structures fall into six basic categories: lay-up, resin transfer molding, filament winding, fiber placement, pultrusion, and braiding/weaving, which are described below. More complete descriptions are available elsewhere, e.g., C. A. Harper, *Handbook of Plastics, Elastomers, and Composites*, $2^{nd}$ Ed., McGraw-Hill, New York, Chapter 5 (1992).

Lay up

In the lay-up process, fiber and matrix material are placed in a mold. The fiber and matrix can be applied separately or simultaneously. Once the placement is complete, the resin is cured. This can be at room temperature and pressure, but better results are obtained when both quantities are elevated in an autoclave or press.

In hand lay-up, fiber mats are placed, resin is sprayed or painted on, and is pressed into the fiber with rollers or squeegees. Then, the material cures at room temperature.

Fiber and resin can be combined before lay-up in several ways. In spray lay-up, fiber is cut and combined with resin in a spray gun, which is then used to coat the mold. Continuous fiber-reinforced "prepreg" (sheets of uncured resin impregnated onto continuous reinforcement fibers) materials can also be used, which materials are used in the manufacturing of composite structures in the aerospace and automotive industry. When prepeg materials are used, automated lay-up becomes easier, in the form of automatic tape lay-up. The system described by Olsen and Craig includes a robot mounted prepreg tape dispenser (see H. B. Olsen and J. J. Craig, *Automated Composite Tape Lay-Up Using Robotic Devices*, Proceedings, 1993 IEEE International Conference on Robotics and Automation, IEEE Computer Society Press, Los Alamitos, Calif., Vol. 3, pp. 291–297

(1993)). The dispensing head is capable of cutting the tape, restarting the dispensing process, and applying pressure at the point of application. It differs from filament winding in this ability to stop dispensing tape (by cutting) and restart at a different point.

Resin Transfer Molding

The hallmark of resin-transfer molding ("RTM") is the injection of matrix resin into a closed mold which contains the fiber. Curing takes place in the mold. The fiber can be woven or braided into an approximation of the final shape, or preform, before being placed into the mold.

Filament Winding

Filament winding can produce very large shapes, provided that the curvature is everywhere convex. A filament winding machine consists of a rotating mandrel and a fiber dispensing head that travels the length of the mandrel. Synchronized with the mandrel rotation, the head can change the angle of the fiber with respect to the mandrel axis, so that helical plies optimized to handle expected loads can be laid down. Filament winding machines are programmable, so that different winding patterns can be specified. The mandrel can also be changed, allowing even more flexibility.

The three main constraints imposed by the filament winding process, in order of increasing difficulty to overcome, are: (1) the mandrel must be removed from the interior of the complete structure; (2) the object must have positive curvature everywhere; and (3) the mandrel must be fabricated. If the shape does not allow the mandrel to be removed intact (e.g., a tube with wider diameter in the middle than at the ends), it can be removed destructively. Plaster and salt mandrels have been used for this purpose.

An object with re-entrant curvature can be filament wound if the winding is followed by suitable post-processing, such as hand lay-up. A disadvantage, however, is that the requirement for a mandrel cannot be avoided.

Fiber Placement

The fiber placement technique was described above. It is an improvement on filament winding in that it can produce shapes with reentrant curvature. However, it still requires a mandrel, and therefore retains the associated disadvantages. Furthermore, the cost of fiber placement machines is very high.

Pultrusion

Pultrusion is the most economical fabrication method for objects having constant cross-section. The fiber and uncured resin are pulled through a heated die which simultaneously shapes and cures the product. Beams and driveshafts are examples of products well-suited to this process.

Note that while this process does not require a mold, a die of the cross-sectional shape is needed.

Braiding and Weaving

The braiding and weaving technique was mentioned in the discussion above of RTM. Dry fibers are braided or woven into configurations optimized for the expected load, and approximately the shape of the target. The resulting network is placed in a mold, impregnated with resin, and cured. The braiding and weaving is performed by programmable machines.

A wide range of shapes can be produced with the same equipment, and smooth transitions from one shape to another are possible. A mold is still required for resin impregnation and curing.

The present invention is a method of and apparatus for producing structures composed of CFPM composites that do not require a mandrel, and are therefore not subject to constraints on producible shapes. This allows shapes to be produced that are otherwise difficult to make using conventional methods. For example, a cylinder-like object, with a square cross-section in the middle and circular cross-section at the ends, can be made with the method of the present invention, but filament winding would require a destructively-removable mandrel. Furthermore, the method of the present invention is implemented with programmable devices, allowing automatic programming of the system to produce a shape from an electronic model of it. The method is the basis of a CFPM rapid prototyping system as envisioned in the discussion above.

BRIEF SUMMARY OF THE INVENTION

The apparatus of the present invention includes a reconfigurable forming surface; holding means for holding the reconfigurable forming surface in a stationary position; a first means for moving the reconfigurable forming surface, such as at least one stage connected to the reconfigurable forming surface, the stage(s) being capable of moving in a first plane and a second plane, the forming surface being moveable and shaped in response to the stage moving in either the first plane or second plane; a flexible mold assembly opposing the reconfigurable forming surface, the composite material being provided between said flexible mold assembly and the reconfigurable forming surface; and, preferably, at least a six degree-of-freedom robot for cooperating with said reconfigurable forming surface to fabricate the composite structure. The invention further includes one or more (multiple) dispensing means for continuously providing the composite material between the reconfigurable forming surface and the flexible mold assembly.

The method of the present invention includes the steps of configuring a forming apparatus to form a composite structure having a predetermined shape in a predetermined manner, the composite structure being defined by a plurality of adjacent patches (patchwise forming of the composite structure); manipulating the forming apparatus with manipulating means in a predetermined manner; curing the patch of the plurality of adjacent patches; and advancing to a next patch until the composite structure is formed. The composite structure is fabricated patch by patch. Further steps include configuring a forming surface and clamping assembly in accordance with a control program; moving a robot so that the next patch or portion to be formed is at the correct pose (position and orientation); and applying pressure to the patch (and heating it where appropriate) for curing and molding the patch. The method further includes the step of determining the correct pose of the robot for each of the method steps. The method steps are performed iteratively until the composite structure is complete.

In general, the present invention offers the ability to form complex shapes (warped, not just curved surfaces) without a mold, patchwise forming of the part, and rapid reconfigurability based only on a computer (electronic) model. The present invention produces: (1) composite structures of the desired shape under automatic control (e.g., right circular cylinders of various thicknesses have been produced with the present invention); (2) satisfactorily-consolidated composites using a variety of composite materials, including preconsolidated or commingled thermoplastic resin with fibers, such as graphite or Kevlar fibers; and (3) satisfactory composite structures of significant thickness (e.g., 14 layers, 1/8" thick, were produced from 0.010" thick preconsolidated tape at Sandia National Laboratories in Albuquerque, N.M.).

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally similar elements throughout the separate views and which are incorporated in and form part of the specification, further illustrate the present invention and, together with the detailed description of the invention and claims, serve to explain the principles of the present invention.

FIG. 5 is a flowchart of the method steps of the present invention.

DETAILED DESCRIPTION OF THE INVENTION

Figure 1:
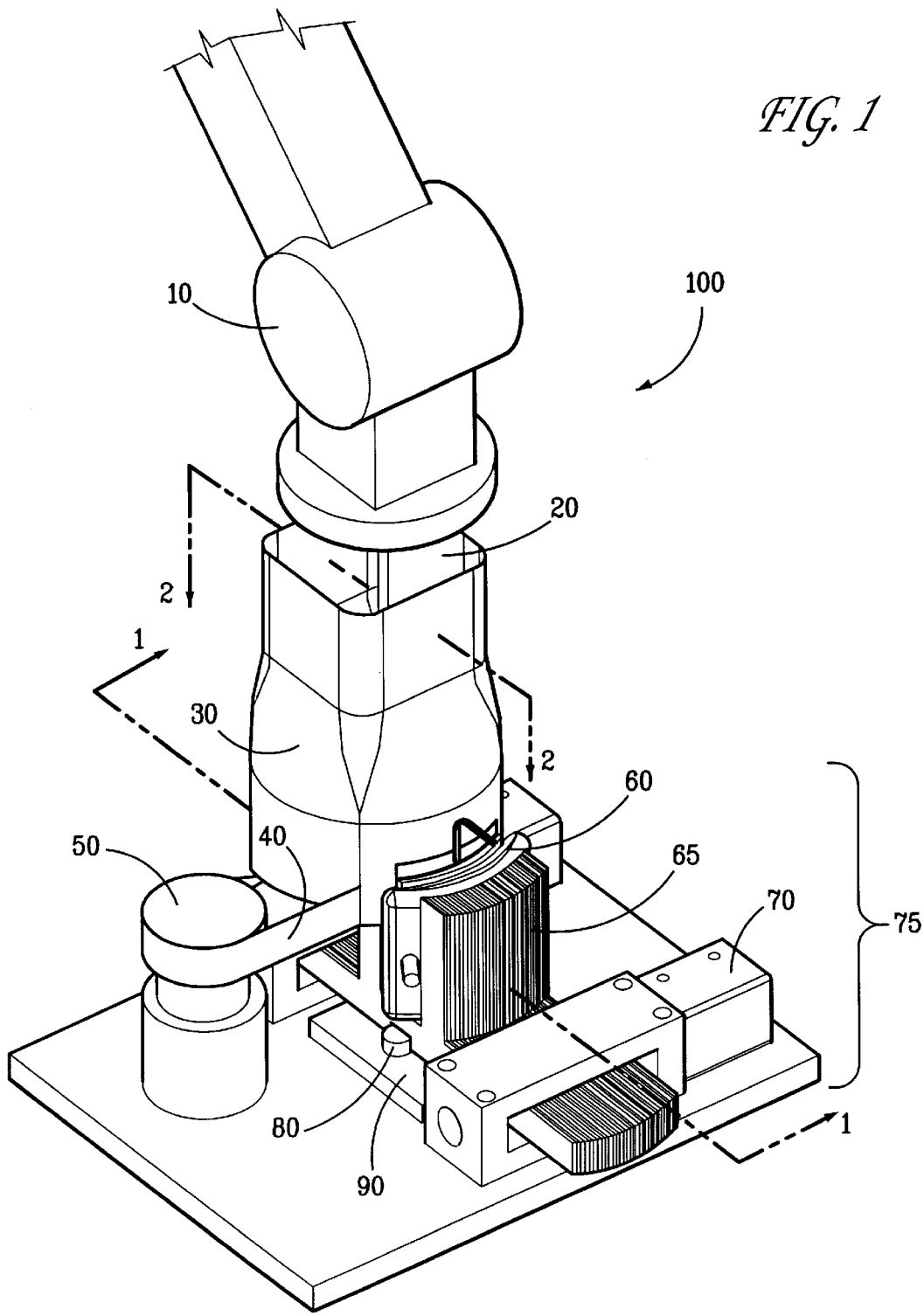
FIG. 1 is an overall isometric view of the forming system in accordance with the present invention.

The present invention includes two main components. The first component is a forming surface 65 on which pressure and heat are applied to the composite material 40 for molding and curing each patch of the structure 30. As used herein "the patch" refers to the portion of the structure 30 that is being formed between the forming surface 65 and the flexible mold assembly 60. Forming surface 65 is reconfigurable in response to a controller 250 (shown in FIG. 4) to form the desired shape of the structure 30 to be fabricated. The second component is a robot having a multi-degree-of-freedom robot arm 10, preferably having at least six degrees of freedom for complicated shapes (although one degree of freedom will suffice for some structure shapes), whose role is to position an evolving structure 30, which is made of composite material 40, so that the patch currently being molded is held at the proper pose (discussed herein). In an alternate embodiment, the forming surface 65 is attached to and maneuvered by the robot arm 10. Both the agile forming apparatus 75 and robot arm 10 are controlled by a single controller 250.

Figure 2:
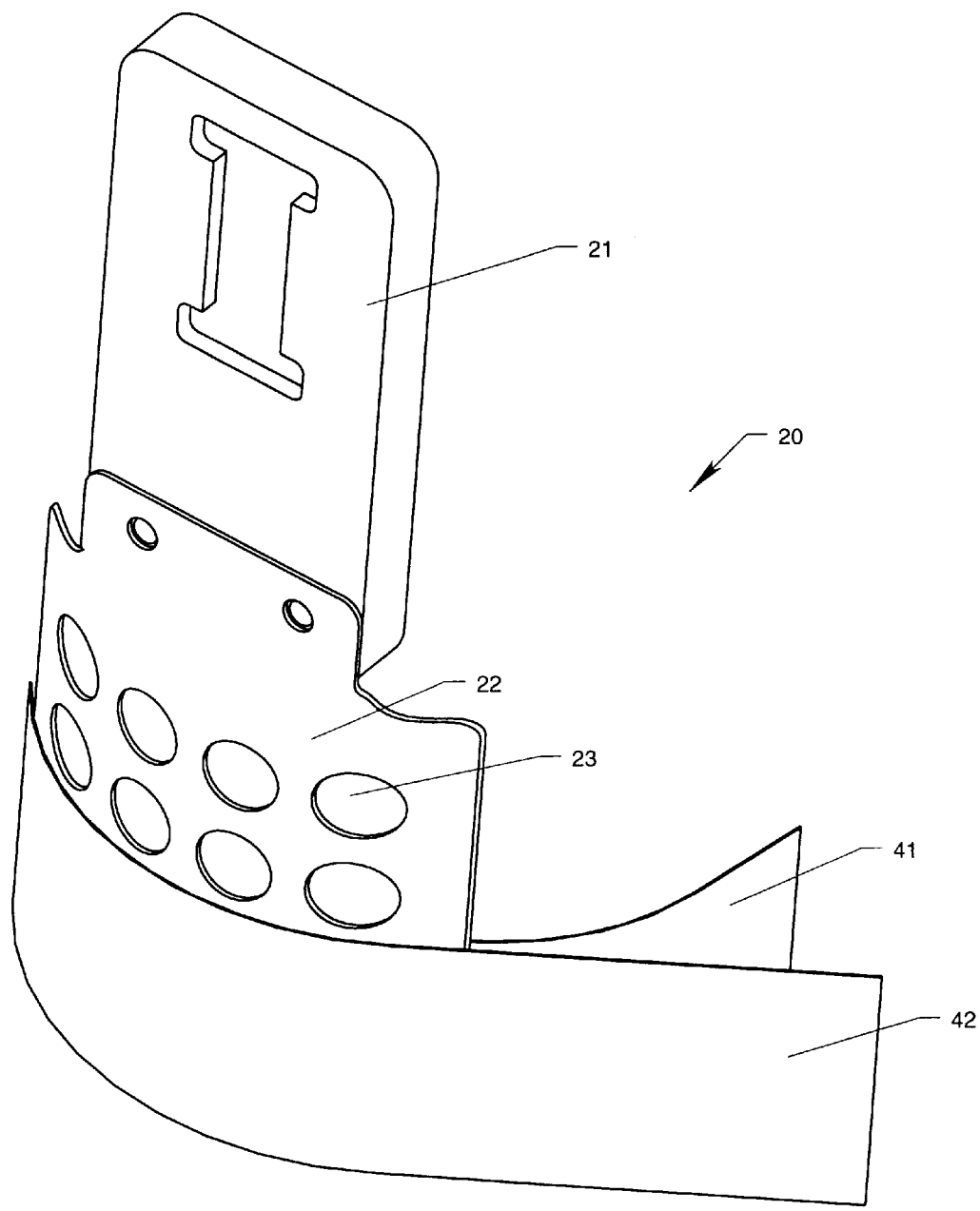
FIG. 2 is a front view of an exemplary structure-holding fixture 20 in accordance with the present invention.

The attachment of robot arm 10 to structure 30 being formed is effected by robot arm 10 grasping structure-holding fixture 20, and then the composite material 40 is fused directly to structure-holding fixture 20 and to itself (initially) to form structure 30. Structure-holding fixture 20 can be any piece of material that can be attached or fused directly to structure 30 being fabricated. It is contemplated that the structure-holding fixture 20 can be eliminated in some applications, and in such cases, the material 40 will be fused directly to the robot arm 10 or some other structure. Referring to FIG. 2, there is shown an exemplary structure-holding fixture 20, which includes an upper portion 21 and a lower portion 22. A plurality of holes 23 are formed through lower portion 22. The attachment is made by inserting structure-holding fixture 20 into forming apparatus 75 along with composite material 40, so that the first patch is fused directly to structure-holding fixture 20 (and secured via the plurality of holes 23) for the first complete wrap of the composite material 40. Additionally, at the onset of the process, the composite material 40 is fed in two pieces 41 and 42 on both sides of the structure-holding fixture 20 (see FIG. 2) and the composite material 40 is fused together through the plurality of holes 23. After one complete wrap of the composite material 40, the succeeding patches are fused to the composite material 40 itself as the composite structure 30 is maneuvered by the robot arm 10. When the composite structure 30 is completely formed, it is removed from structure-holding fixture 20 by cutting the initial portion of the structure 30 that is connected to the structure-holding fixture 20.

System 100 includes at least one dispensing means 50 mounted on support structure 95 for dispensing composite material 40; in practice, the composite material 40 is provided in a roll of flat tape (radially-expansible or coiled) and is unrolled as it is dispensed by dispensing means 50, here a tape dispenser. Multiple dispensing means can be provided depending on the structure to be fabricated. Although a tape dispenser has been described for convenience in describing the present invention, other dispensing means for providing material 40 to forming apparatus 75 can be used, including but not limited to the types of dispensing means used in filament winding. In some cases, however, composite material 40 will be provided in a continuous fashion, which does not need to be cut until structure 30 has been fabricated. The cross-section of the portion of structure 30 fused to structure-holding fixture 20 is cut off (along view line B—B in FIG. 1) when structure 30 is completely fabricated (similar to a sprue in molding) as determined by control program 260. Because the shape of the patch and the location and orientation of robot arm 10 relative to the formed patch are continuously variable, very few limitations exist on the shape of structure 30 that can be produced.

The present invention can be implemented using a conventional Fanuc RJ controller and S-800 arm. These commercially-available parts are available from Fanul Robotics North America, Inc., 2000 South Adams Road, Auburn Hills, Mich., 48326-2800, ph: 313/377-7234. Additionally, the present invention can be implemented using a conventional Stäubli arm and Adept MV controller. These commercially-available parts are available from Stäubli France SA, 183 Rue des Usines 74210, Faverges, France, ph: (50) 656060 or Adept Technology, Inc. 150 Rose Orchard Way, San Jose, Calif. 95134, ph: 408/432-0888. Other parts can be used and will become apparent to those of skill in the art.

Figure 3:
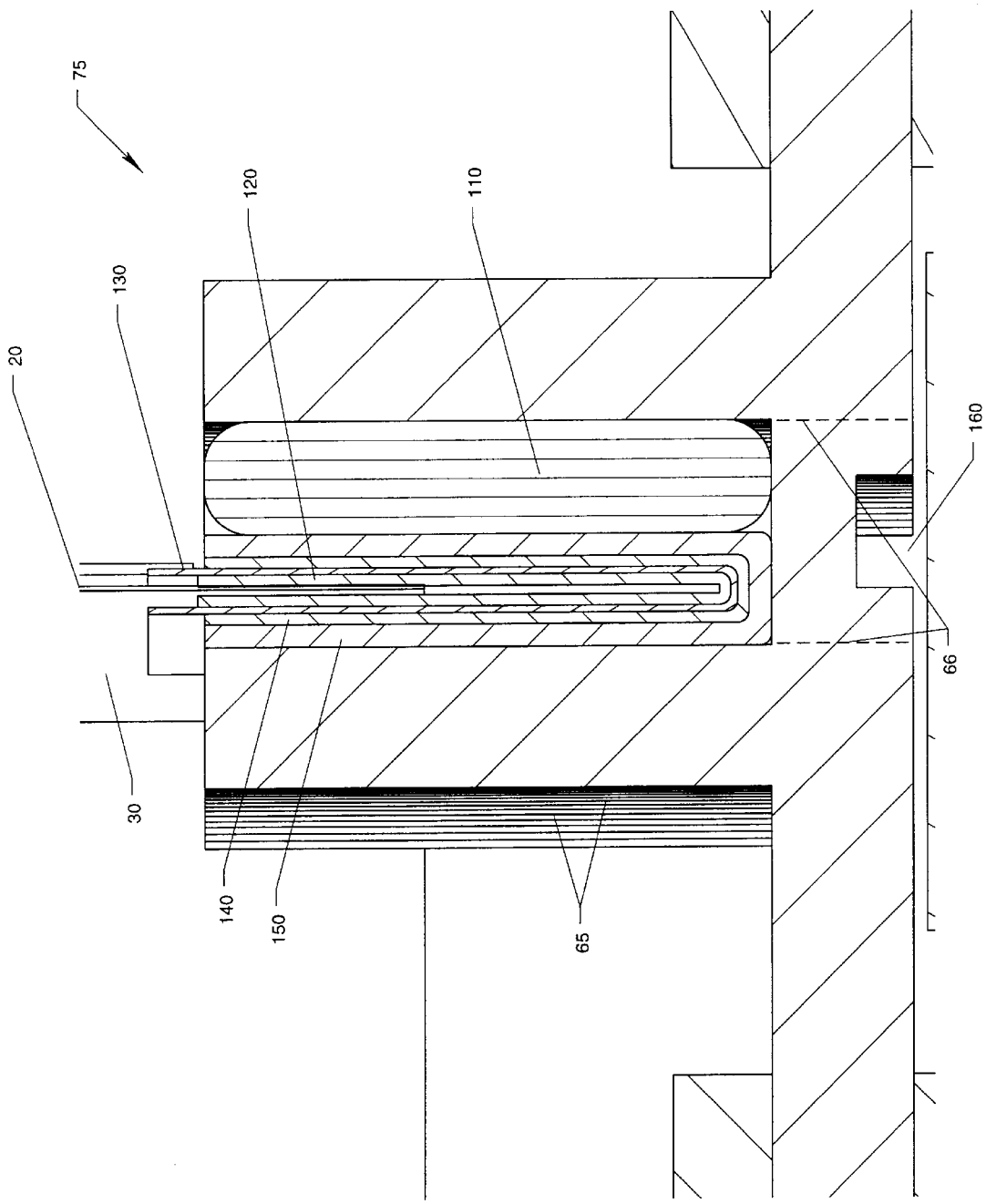
FIG. 3 shows a cross-section of the forming system in accordance with the present invention.

Forming apparatus 75 will now be described in more detail with reference to FIG. 3, followed by the manner in which it is integrated with the robot. FIG. 3 shows a cross-section of forming apparatus 75 taken along view line A—A in FIG. 1. Flexible mold assembly 60 is shaped or affected by forming surface 65, which can include a plurality of adjustable leaves to form two-dimensional patches or a plurality of protrusions (finger- or pin-like) to form three-dimensional patches, that acts similar to a contour gauge. By adjusting the position of forming surface 65, a large class of continuous two- or three-dimensional curves can be realized at this particular patch position. In practice, for example and depending on the structure to be fabricated, the total length of forming surface 65 composed of the edges of the plurality of adjustable leaves will vary. For example, larger structures to be fabricated will require a larger reconfigurable surface. Additionally, the geometrical design of the plurality of adjustable leaves can vary, e.g., can be circular, rectangular, octogonal, etc. Each of the plurality of adjustable leaves can be either of unitary construction or two or more independently-controlled pieces, e.g., as indicated by the dotted lines 66 in FIG. 3. Additionally, the geometrical design of the leaves can be adapted such that composite material 40 can be fed all the way through forming apparatus 75 without contacting any of the adjustable leaves; the leaves in this configuration can be either of unitary construction or two or more independently-controlled pieces. These embodiments would require slot 160 to be placed at a different location and the other elements (e.g., pressure and heating means) of forming apparatus 75 to be configured accordingly. The required patch shape is made by leaf-adjusting cam 80, which runs through slot 160 on the bottom of X-Y stage 90. Any conventional X-Y stage having multiple axes of motion can be used. Many commercial manufacturers stack one linear stage in the X direction upon a second linear stage in a Y direction and a third linear stage in a Z direction, in order to provide three degrees of freedom. As a non-limiting example, most people understand the principles behind an Etch-a-Sketch®, which is a set of stages controlled with two knobs, one for each of the of X and Y directions.

Cam 80 is mechanically connected to the X-Y stage 90 once it is received by slot 160. The slot 160 can be formed through the center of the adjustable leaves as shown in FIG. 3, at either end of the adjustable leaves (not shown), or at any point of the adjustable leaves as long as the principle of cam 80 being capable of moving and adjusting the forming surface 65 is followed. Cam 80 adjusts forming surface 60 in response to movement of cam 80 within slot 160; cam 80 is driven by X-Y stage 90 (because it is mechanically connected to X-Y stage 90), which is commanded to move in a series of paths that result in the required shape for structure 30. The control commands 240 to X-Y stage 90 for shaping the surface of forming surface 65 are sent from the controller 250 (FIG. 4) to the X-Y motors (not shown) via, for example, a serial communications line such as a conventional RS-232 communications line. The control commands 240 include the surface shape commands for controlling the movement of the adjustable leaves of forming surface 65, the control signal that controls the temperature of heater 130 (which is typically an analog signal), and the on/off switching of heater 130 and pressure bladder 110 (which is typically a digital signal). Although a pressure bladder 110 has been described here for convenience of introducing the present invention, any pressure means capable of applying pressure to material 40 can be used, including a spring bladder. Moreover, any means capable of curing the patch of material 40 can be used, e.g., by applying heat, pressure, curing agents, plasmas (e.g., charged particles, charged ions, electron beams, etc.), ultraviolet treatments, some other means of curing, etc. Once forming surface 65 is in the proper position, leaf clamping assembly 70 is actuated to hold forming surface 65 in a stationary position during the forming process. The patch of structure 30 is then molded and cured by applying pressure and then heat to the patch between forming surface 65 and flexible mold assembly 60. For thermosets, the application of pressure to the patch is required but heat may not be required, depending on the thermoset and the process.

Referring to FIG. 3, a vertical cross-section of forming apparatus 75 is shown (taken along view line A—A in FIG. 1). Pressure is applied to the patch of structure 30 by inflating pressure bladder 110, preferably constructed of silicone rubber, and heat is applied to the patch of structure 30 by flexible heater 130. In one embodiment, flexible heater 130 is folded in a U-shape or provided in two pieces on either side of the patch such that both sides of structure 30 are heated as shown in FIG. 3. For some shapes to be fabricated, the elements (e.g., heater 130 and insulating materials) surrounding structure holding fixture 20 and structure 30 will be provided in two pieces on both sides thereof. A measuring means (not shown) on the back side of heater 130 is used to measure the temperature of heater 130. Measuring means can include any device capable of indicating a temperature change, such as a thermocouple, RTD (resistance temperature sensor), resistive elements, or the like. Material separator 120, preferably constructed of spring steel or Teflon® material, i.e., any material with a smooth surface and able to withstand heat, is also folded in a U-shape or provided in two pieces on either side of the patch such that both sides of structure 30 are separated from flexible heater 130 and serves as the release for flexible mold assembly 60. Sheet 140, constructed for example of silicone, is also folded in a U-shape or provided in two pieces on either side of the patch and serves to insulate and provide a barrier to the insulating material 150. Sheet 140 is not always necessary and will depend on the use of insulating material 150. Insulating material 150, constructed for example of alumina felt, is also folded in a U-shape or provided in two pieces on either side of the patch and serves to insulate the heated patch of structure 30, i.e., the patch between forming surface 65 and flexible mold assembly 60, from the forming surface 65, so that heat is prevented from dissipating into the forming surface 65. Similar to sheet 140, insulating material 150 is not always necessary and will depend on the bladder's material of construction, i.e., if the bladder can withstand heat without melting against material separator 120, which is not always a concern depending on the construction of the bladder. Insulating material 150 also serves to smooth out the stair-stepping that forming surface 65 introduces to the structure 30 during the forming process. The pneumatics for the pressure bladder, and the electronics for heater 130 and the thermocouple, are controlled using the input/output system of robot controller 250,i.e., control commands 240, in a manner well known to those skilled in the art.

Figure 4:
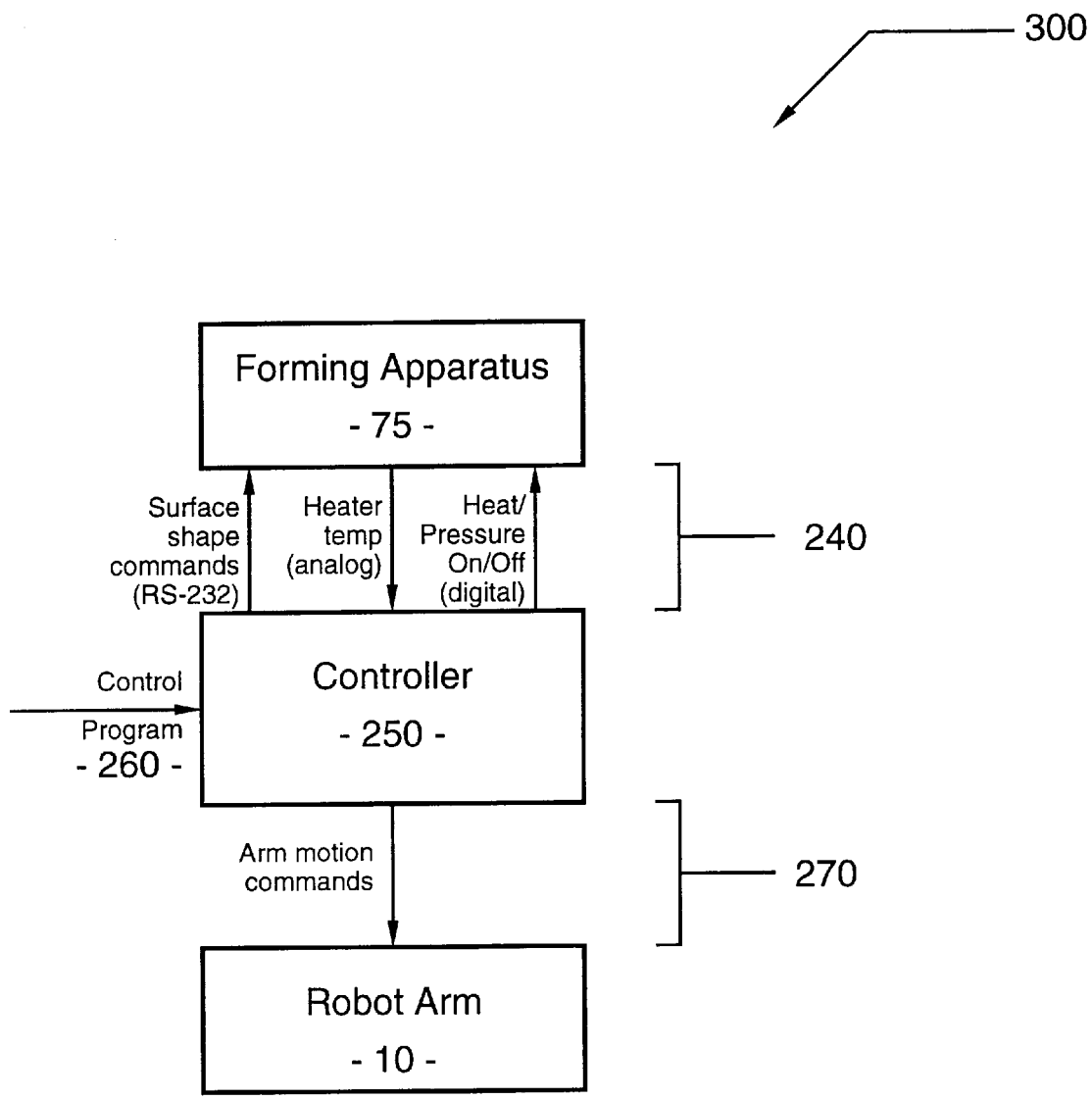
FIG. 4 is a block diagram of the control system of the present invention.

Referring to FIG. 4, control system 300 can be described.

The following control cycle is executed repeatedly until the predetermined shape of structure 30 is complete. Initially, heater 130 is in an off state, the pressure bladder 110 is vented, and the clamps of leaf clamping assembly 70 are not set, ie., the plurality of adjustable leaves of forming surface 65 are not held stationary. Steps 100 and 200 below can be performed concurrently depending on the shape of structure 30 to be fabricated. Structure 30 can have 90° angles that would require steps 100 and 200 to be performed concurrently.

Referring to FIG. 5, the method of the present invention will now be discussed in more detail.

Step 100 comprises configuring a forming apparatus to form the predetermined shape in a predetermined manner. Step 100 includes configuring forming surface 65 with the assistance of moving means (for example, X-Y stage). Clamping assembly 70 is set in accordance with control program 260 (control program 260 is not described in detail as it is not necessary to understand the present invention) to hold the forming surface 65 in a stationary position. Control program 260 is executed via shared controller 250.

Step 200 comprises manipulating the forming apparatus with manipulating means, for example a robot, in a predetermined manner. Step 200 includes moving robot arm 10 via motion commands 270 in accordance with control program 260 so that the next patch to be formed is at the correct pose (position and orientation).

Step 300 comprises providing material to the forming apparatus to fabricate the structure.

Step 400 includes curing a patch of the plurality of patches. Step 400 further includes step 410 for curing material 40 by applying pressure to the patch, by, for example, inflating a pressure or spring bladder. If heat is required to cure the material 40 (as it is for some composite materials), then Step 400 further includes the step 420 of applying heat to the patch. For example, thermoplastics need to be heated to be cured, and thus, Step 420 would include turning on heater 130 via control commands 240 in accordance with control program 260. Other means for curing the material 40 can be used (e.g., ultraviolet exposure, pulsed power, intense ion beam exposure, etc.).

Step 430 includes maintaining the temperature of heater 130 for a predetermined time (dwell time), if a heater is used, when it reaches a temperature appropriate for shaping material 40 (depends upon the characteristics of material 40) via control commands 240 in accordance with control program 260.

Step 440 includes releasing pressure by venting pressure bladder when heater 130 reaches the consolidation temperature of material 40 via control commands 240 in accordance with control program 260. The consolidation temperatures and minimum temperature are variable depending upon the material 40. For example, if nylon is used as material 40, then the consolidation temperature is 450° F., and the minimum temperature is 300° F.

In operation, pressure bladder 110 need only be inflated to 3 to 15-psi. This pressure is surprisingly low, considering initial tests with hydraulic presses had indicated that 50–100 psi would be necessary. Such pressures are also needed in many conventional composite lay-up systems. However, it has been observed that greater pressures can lead to distortion of the fibers and flashing of the resin. Furthermore, full consolidation is obtained at the lower pressure. It is contemplated that the low pressure suffices because it is hydrostatic, whereas presses do not provide true hydrostatic pressure.

The method steps further include step 450 for periodic unwinding of the wrist (as necessary) of the robot arm 10 as it is limited in its rotation after one full revolution and should return to its initial position before the next patch is started. While the wrist of robot arm 10 is unwinding, returning to its initial starting position, the structure 30 being fabricated is held in place between pressure means 110 and forming surface 65.

Figure 6:
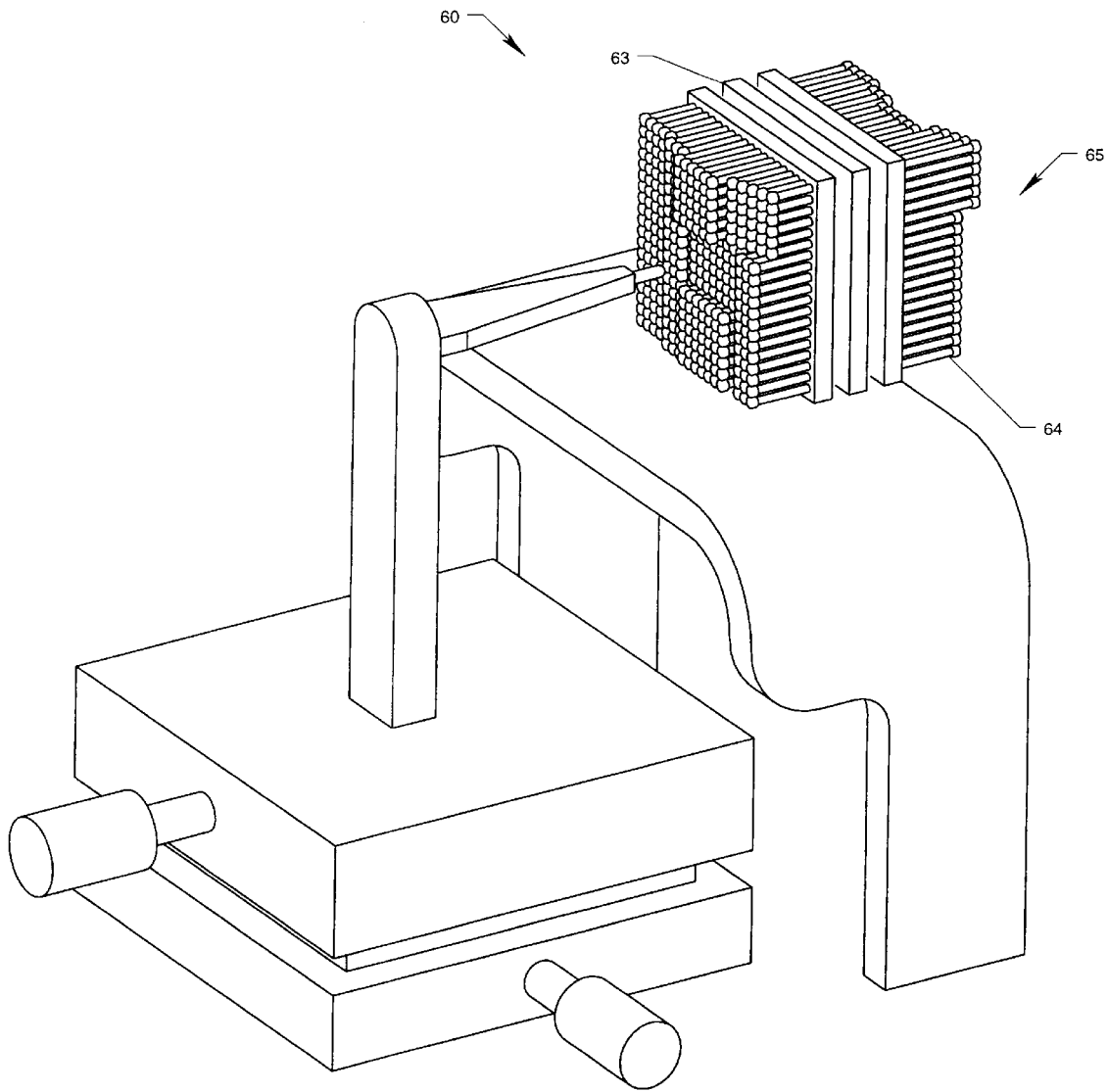
FIG. 6 is a isometric view of an alternate embodiment of the reconfigurable forming surface in accordance with the present invention.

Referring to FIG. 6, in an alternate embodiment, a system is included as part of forming apparatus 75 to allow for movement of reconfigurable forming surface 65 in a second plane for forming a patch with two directions of curvature (warped at any point of the patch). However, the plurality of adjustable leaves of reconfigurable forming surface 65 takes a different form than the adjustable leaves. Forming surface 65 includes a plurality of protrusions 64 that are finger or pin-like structures. There are two plates that are used to guide the protrusions 64 into place, where they are clamped by the center plate[ ]. In this alternate embodiment, forming surface 65 is configured, held in a stationary position by clamping means 63, and used by the forming apparatus 75 to form "warped" in addition to curved patches as discussed above. In this alternate embodiment, the forming apparatus 75 can be either static or dynamic. The alternate embodiment presented herein includes all of the necessary elements and features listed in the embodiment discussed above and, thus, will not be discussed again.

In yet another alternate embodiment, flexible mold assembly 60 and reconfigurable forming surface 65 are directly connected to robot arm 10 rather than on a separate support structure 95. In this alternate embodiment, forming apparatus 75 is connected to and maneuvered by robot arm 10, i.e., forming apparatus 75 moves in response to movement of robot arm 10 to fabricate structure 30. In this alternate embodiment, structure 30 can be stationary or move with robot arm 10. The alternate embodiment presented herein includes all of the necessary elements and features listed in the embodiment discussed above and, thus, will not be discussed again.

EXAMPLE

Figure 7:
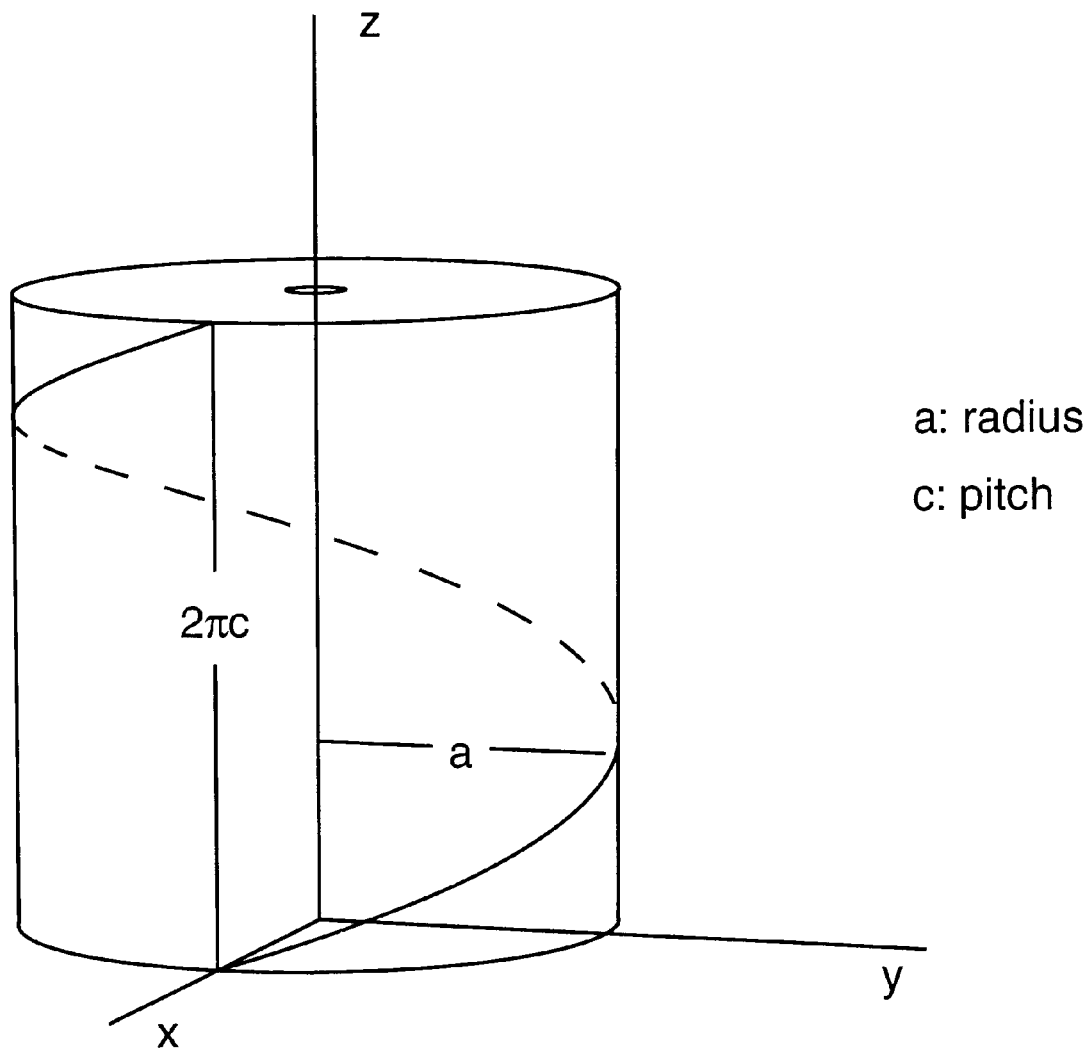
FIG. 7 is a diagram (for use with the example presented herein) of a model used to create a composite structure having the shape of a right circular cylinder.

The particular values and configurations discussed in this non-limiting example can be varied and are cited merely to illustrate an embodiment of the present invention and are not intended to limit the scope of the present invention. In the following example of this embodiment, reference is made to FIG. 7. The system 100 was programmed via control program 260 to produce a right circular cylinder structure with a helical winding path. The robot used should have at least two-degrees-of-freedom (rotation and translation) to construct the cylinder. The winding pattern required to realize the desired shape must be specified. The winding pattern is represented as a parametric space curve. In the case of a cylinder, a helical winding pattern is appropriate. A circular helix has radius a, pitch angle θ, and pitch c. Pitch c is chosen to provide the desired or correct amount of overlap on successive wraps or layers of material 40. The parametric representation of the helix is:

$$\cdot a \cos (s/\omega)i + a \sin (s/\omega)j - c (s/\omega)k, \qquad (1)$$

where $$\omega = \sqrt{a^2 + c^2} ;$$

s serves as the arc length parameter for the circular helix. Arc length s corresponds directly to the amount of composite material 40 dispensed from dispensing means 50 in forming the right circular cylinder. That is, the number of steps of the forming process represents the arc length s of the winding pattern.

For each step, the shape of forming surface 65 and the pose of the robot arm 10, which holds structure 30 fabricated so far, must be determined. For the cylinder, the shape of forming surface 65 is not changed; it slightly larger than the arc of a circle of the desired radius but is determined here for generality. The pose of the robot arm 10 traces out the helix given as the winding pattern. The pose of the robot and shape of the forming surface 65 at each step are determined as follows.

For space curves satisfying certain continuity, differentiability, and curvature conditions, such as the helix, there is a unique set of three mutually-orthogonal unit vectors at each point on the curve (see E. Kreyszig, *Advanced Engineering Mathematics,* John Wiley and Sons (3$^{rd}$ ed. 1972)). These vectors are referred to as the unit trihedron of the curve at the given point, and serve as the specification of the orientation of the robot for that step of the process. The unit trihedron consists of the unit tangent vector, the unit principal normal vector, and the unit binormal vector. Let r(s) be the position vector of the curve; then ṙ(s) is the tangent vector (the dot indicates differentiation with respect to the parameter s). If the parameter is the arc length, then the tangent vector is guaranteed to be of unit magnitude. The unit tangent vector is denoted by the symbol u(s); like the other members of the unit trihedron, its value is functionally dependent on the parameter.

The principal normal is defined as r̈(s) ; its magnitude is defined to be the curvature of the curve. Therefore, the unit principal normal is obtained from the principal normal by dividing it by the curvature of the curve at that point (which cannot be zero). The unit principal normal vector is denoted by p(s). The unit binormal b(s) is defined as:

b(s)=u(s)×p(s).

The procedure used to obtain a program to trace the helix is to compute the unit trihedron as a function of the arc length, and use it to determine the required (predetermined) pose for each step of the forming process. The unit trihedron is represented as a rotation matrix. The Fanuc R-J controller, for example, requires that poses be specified as yaw-pitch-roll triples, thus, a further step includes extracting these values from the rotation matrix. The procedure given on page 47 of Craig (J. J. Craig, *Introduction to Robotics: Mechanics and Control,* Addison-Wesley, Reading, Mass. (1989)), for example, can be used for the extraction. In particular, the helix required for the coordinate system used in the workcell of this example is represented parametrically as:

r(s)=−a cos (s/ω)i−a sin (s/ω)j−c (s/ω)k, leading to the rotation matrix:

$$\begin{pmatrix} \cos(s/\omega) & \sin(s/\omega) & 0 \\ (a/\omega)\sin(s/\omega) & -(a/\omega)\cos(s/\omega) & -c/\omega \\ (c/\omega)\sin(s/\omega) & -(c/\omega)\cos(s/\omega) & -a/\omega \end{pmatrix}.$$

The first row is p(s), the second row is u(s), and the third row is b(s). When the parameter is zero, the first row p(s) projected onto the xy plane is parallel to the x axis, and the second row u(s) projected onto the xy plane is parallel to the y axis. The yaw-pitch-roll angles that are required are extracted using the following formulas, $$\text{yaw} = \text{atan2}\left(\frac{-(c/\omega)\cos(s/\omega)}{\beta}, \frac{-(a/\omega)}{\beta}\right);$$

$$\text{pitch} = \text{atan2}\left(\frac{-(c/\omega)\sin(s/\omega)}{\beta}, \beta\right);\ \text{and}$$

$$\text{roll} = \text{atan2}\left(\frac{(a/\omega)\sin(s/\omega)}{\beta}, \frac{\cos(s/\omega)}{\beta}\right),$$

where $\beta = [((a/\omega)\sin(s/\omega))^2 + (\cos(s/\omega)^2)]^{\frac{1}{2}}$.

By its nature, the principal axes of the forming surface 65 aligns with the axes of the unit trihedron. For any patch, define the arc length at the center of the forming surface as $s_0$. The surface required to form the patch (in local patch coordinates) can be determined by applying the rotation matrix at the patch center to the parametric equation of the helix translated to the patch center:

$$p(s-s_0) = R(s_0)[r(s) - r(s_0)]$$

$$= \begin{bmatrix} a\left(1 - \cos\left(\frac{s-s_0}{\omega}\right)\right) \\ \frac{a^2}{\omega}\sin\left(\frac{s-s_0}{\omega}\right) + \frac{c^2}{\omega}\left(\frac{s-s_0}{\omega}\right) \\ \frac{ac}{\omega}\left(\sin\left(\frac{s-s_0}{\omega}\right) + \left(\frac{s-s_0}{\omega}\right)\right) \end{bmatrix}.$$

All components of the surface are a function of the arc length from the patch center (s−s$_0$). For the forming apparatus shown, two dimensions are formable so a two-dimensional description of the shape is needed. This shape is the first two components of the patch function. The third component is used only for a full three-dimensional forming surface.

The right circular cylinder illustrated here affords a simple closed form solution. In general, complex structures will be produced using an identical or substantially similar analysis but employing numerical solutions of the equations.

A novel rapid prototyping method and apparatus is described that produces structures made of continuous fiber polymer-matrix composites, but does not use a mold. One embodiment uses commingled and preconsolidated thermoplastic and graphite composite material. The quality of the composite structures produced with the present invention is comparable to that of structures produced using filament winding on a mandrel. The present invention has, for example, produced cylindrical objects under automatic control using this system. Producing non-convex shapes with the system is obviously possible, simply by reconfiguring the forming surface 65 as appropriate.

Because the present invention includes programmable devices, i.e., a robot arm 10 and an X-Y stage 90 connected to the forming surface 65, the control program 260 needed to produce a particular shape can be automatically generated (automatically programmed) from an electronic model, e.g., using a CAD/CAM system, of the predetermined shape.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention can involve components having different characteristics as long as the principle, the presentation of a novel robotic technique for rapid fabrication of composite structures using a reconfigurable forming surface and a multi-degree of freedom robot, is followed. For example, active cooling means can be added to the present invention to reduce the length of time spent waiting for the assembly to cool down before fabricating the next patch. Additionally, the present invention is scaleable either upward or downward in size for wide applications in different environments. It is intended that the scope of the present invention be defined by the claims appended hereto.

We claim:

1. A method for freeform fabrication of a structure, the structure having a shape, the structure being formed by a plurality of patches, comprising, in the order presented, the steps of:

a) configuring a reconfigurable forming apparatus to a configuration for forming one patch of the plurality of patches forming a portion of said shape and moving said forming apparatus to a proper spatial position with manipulating means,
   i) wherein said reconfigurable forming apparatus comprises a reconfigurable forming surface having a first adjustable surface contour, and an opposing flexible mold assembly, and
   ii) wherein said configuring step comprises the steps of adjusting said first adjustable surface contour to match said portion of said shape;
b) providing material to said forming apparatus at said position, wherein said providing step comprises placing said material between said reconfigurable forming surface and said opposing flexible mold assembly;
c) shaping said material between said reconfigurable forming surface and said opposing flexible mold assembly to form said patch;
d) curing said patch; and
e) sequentially advancing said reconfigurable forming apparatus to a plurality of other spatial positions each corresponding to a portion of said shape and there repeating steps a), b), c) and d) until said structure is formed.

2. A method for freeform fabrication of a structure having a shape comprising, in the order presented, the steps of:
a) configuring a reconfigurable forming apparatus at a first location to correspond to a first portion of said shape,
   i) wherein said reconfigurable forming apparatus comprises a reconfigurable forming surface having a first adjustable surface contour, and an opposing flexible mold assembly, and
   ii) wherein said configuring step comprises the steps of adjusting said first adjustable surface contour to match said portion of said shape;
b) providing material to said forming apparatus, wherein said providing step comprises placing said material between said reconfigurable forming surface and said opposing flexible mold assembly;
c) shaping said material between said reconfigurable forming surface and said opposing flexible mold assembly to form a patch forming said first portion of said shape
d) curing said patch;
e) moving said forming apparatus to a different location corresponding to another portion of said shape; and
f) repeating steps a) through e) until said structure is formed.

3. The method of claim 2, further comprising the step of maintaining the reconfigurable forming apparatus in a stationary position during said curing step.

4. The method of claim 2, wherein said step of curing further comprises a step of applying heat to the patch using heating means and a step of applying pressure to the patch using pressure means.

5. The method of claim 4, wherein said step of applying pressure and said step of applying heat comprise the steps of:

changing said applied temperature; and changing said applied pressure.

6. The method of claim 1, wherein said manipulating means comprises a robot having at least one degree of freedom.

7. The method of claim 6, further comprising the step of determining a correct position of said robot for each of said steps.

8. The method of claim 6, further comprising the step of returning said robot to an initial starting position before said step of sequentially advancing said reconfigurable forming apparatus to a plurality of other spatial positions.

9. The method of claim 2, further comprising the step of determining said shape of said structure based on an electronic model.

10. The method of claim 6, further comprising the step of automatically programming said robot.

11. The method of claim 2, further comprising said step of cooling said forming apparatus before said step of moving said forming apparatus to a different location corresponding to another portion of said shape.

12. The method of claim 2, wherein said forming apparatus is adapted to fabricate a variety of different shapes.

13. The method of claim 2, wherein said material is a composite material.

14. A method for freeform fabrication of a structure having a shape comprising, in the order presented, the steps of:
a) configuring a reconfigurable forming apparatus to correspond to a portion of said shape,
   i) wherein said reconfigurable forming apparatus comprises a reconfigurable forming surface having a first adjustable surface contour, and an opposing flexible mold assembly, and
   ii) wherein said configuring step comprises the steps of adjusting said first adjustable surface contour to match said portion of said shape;
b) providing a portion of material to said forming apparatus and molding and curing said portion of material to form a patch, wherein said providing step comprises placing said portion of material between said reconfigurable forming surface and said opposing flexible mold assembly;
c) reconfiguring said reconfigurable forming apparatus to correspond to a subsequent portion of said shape adjacent to said portion of said shape and moving said forming apparatus to a position corresponding to said subsequent portion of said shape;
d) providing another portion of said material to said reconfigurable forming apparatus and molding and curing said another portion of said material to form a subsequent patch adjacent said patch, wherein said curing step comprises fusing said subsequent patch to said patch previously formed; and
e) repeating steps c) and d) until said structure is formed.

* * * * *